2,886,440
CHEWING GUM AND METHOD OF PRODUCING

Franklin Kramer, Lexington, and Harold Rosenthal, Newtonville, Mass., assignors to General Foods Corporation, New York, N.Y., a corporation of Delaware No Drawing. Application July 3, 1956
Serial No. 595,577

13 Claims. (Cl. 99—135)

This invention relates to an improved chewing gum having a flavor which is controllably released over an extended period of time and to a process for preparing the same.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents e.g. oil of wintergreen, oil of spearmint, oil of peppermint, licorice, fruit flavors, spice oils, etc.; or sweetening agents which may be sugars including sucrose or dextrose and/or they may be artificial sweeteners such as cyclamates or saccharin. Other optional ingredients may also be present.

It is found that when most flavored chewing gums, such as slab gums, are chewed the initial perception of flavor appears after a minute or more at a low level, and after three or four minutes of chewing the flavor intensity drops to an uninteresting level. It is also found upon analysis, that gum chewed for as long as thirty minutes may retain as much as 60% of the flavor initially present, and that this proportion of the flavoring agent is thus not effectively used.

It is an object of this invention to provide a chewing gum containing a flavoring composition characterized by an almost instantaneous flavor perception over an extended period of controlled flavor release. A second object of this invention is to provide a chewing gum containing a flavoring composition which is similar in flavor character to that of the original flavoring oil.

A third object of this invention is to increase the total amount of flavor released during the chewing period of gums containing the herein described flavoring composition. A fourth object of this invention is to permit reduction in the amount of flavoring oil necessary to obtain a desired flavor level in a chewing gum. Other objects of this invention will be apparent to those skilled-in-the-art from the following detailed description of the invention.

It has now been discovered that it is possible to obtain a chewing gum containing a flavoring composition which provides almost instantaneous flavor release, extended flavor perception time, true flavor character, controlled release of a large proportion of flavoring agent, and reduction in amount of flavor oil required. This flavoring composition comprises very fine spray-dried gelatin particles containing therewithin even smaller discrete micro-droplets of a volatile, water-immiscible flavoring agent. Preparation of the flavoring composition employed in the chewing gum product of this invention may be effected by emulsifying the flavoring agent in an aqueous solution of gelatin and spray-drying the so-formed emulsion.

The gelatin which may be employed in this invention may be any of the grades and types of gelatin, including those obtained from e.g. tanner's stock, ossein, pigskin, etc. The Bloom of the gelatin which is employed may vary widely. Although a particularly rapid release may be obtained by use of gelatin having a Bloom of about 50 or less, the Bloom may be as high as 200 or even higher. Although the pH of the gelatin solution employed may fall within the range of 2 to 10, it is preferred that it be maintained in the acid region, e.g. 2 to 5.

In carrying out the process of this invention, a gelatin solution may be formed containing 5 to 100 parts of gelatin per one hundred parts of water, the latter being preferably at temperature of 90° F. to 180° F. during dissolution of the gelatin. The solution is allowed to cool preferably to 33° F. to 75° F., and it is then solidified by spray-drying.

Prior to the spray-drying of the gelatin solution and preferably after cooling to 80° F. to 140° F., the desired volatile, water-immiscible flavoring agent may be added to the solution and homogenized to form an emulsion. The flavoring agents which may be employed include oil of peppermint, oil of spearmint, fruit essences, licorice, spice oils, and the like. The selected flavoring agent may be added in an amount equal to 10% to 100% of the weight of the gelatin.

When the emulsion of flavoring agent in gelatin solution is solidified by spray-drying, the resultant spray-dried emulsion has the flavoring agent in the form of discrete micro-droplets encapsulated in very fine particles of dried gelatin. The solid spray-dried emulsion will be in powder form which may be 40 microns to 300 microns or less; preferred size is 40–60 microns.

Formation of flavored chewing gum may be effected by mixing from 3% to 30%, by weight of spray-dried flavoring composition with from 70% to 97%, by weight of gum base. A preferred composition has 15% of spray-dried flavoring composition in 85% by weight of gum base. Typically the gum base will be chicle, although it may be jeluton, guttakay, etc. Other ingredients including sweetening agents, coloring agents, etc. may be present in desired amount.

Although the chewing gums of this invention may be prepared from a single flavoring agent, it is possible to extend the range of properties of the gum by use of combinations of two or more spray-dried flavoring compositions. For example, it is possible to separately prepare spray-dried flavoring compositions from gelatins of various Blooms, and then to add these compositions to a gum. Such a chewing gum may, for example, contain a mixture of flavoring compositions prepared from a low Bloom gelatin (characterized by a rapid flavor release) and a high Bloom gelatin (characterized by a longer flavor release). The properties of the chewing gum product will be intermediate to the properties obtained from each of the flavoring compositions when used separately. Specifically if a flavoring composition formed from 50 Bloom gelatin is mixed with a flavoring composition formed from 200 Bloom gelatin, and the mixture is added to a chewing gum, the product may have a flavor release which is substantially more even over the chewing period than is the case when a single flavoring composition is employed.

Similarly it is possible to modify the properties of the product gum by use of mixtures of spray-dried flavoring compositions characterized by different ratios of gelatin to oil. If a composition containing 10% flavoring agent and 90% gelatin is mixed with one containing 50% flavoring agent and 50% gelatin the resulting blended flavoring composition will yield a chewing gum having a more even liberation of flavor than is obtained by use of either flavoring agent alone.

Liberation of flavor of the product chewing gum of this invention may also be modified in controlled manner to obtain an even, sustained flavor level from the time chewing begins and thereafter for a protracted period of time far in excess of that obtained today in any chewing gum, by using mixtures of flavoring compositions (a) of different particle size, the resulting gum deriving much of its initial flavor from the smaller particles and much of its later flavor from the larger particles; or (b) formed from gelatins of different pH, the composition formed from gelatin of higher pH (e.g. 6) giving quick release of flavor, while that formed from lower pH (e.g. 2.5) giving slower release.

It is also possible to obtain chewing gum products having extended flavor liberation time by use of the herein described spray-dried fixed flavors in combination with unfixed flavors. A particularly desirable product contains unfixed flavor and spray-dried flavor in proportions of about 3:1. This product is characterized by an interesting or pleasing flavor level which may start at 2–3 seconds and last for 7–8 minutes. Over substantially its entire period of flavor release, the flavor level is higher than that of the standard gum, and the flavor is rich, full, and true.

It is particularly characteristic of the chewing gum product of this invention, that it has an almost instantaneous to very early flavor perception when chewed. Usually flavor is apparent in not more than in one or two seconds when chewing gums prepared in accordance with this invention. Prior art chewing gums containing only free unfixed flavor have initial flavor perception after 7–10 seconds and frequently after times as long as one minute.

It is also characteristic of this chewing gum product that it retains its flavor under conditions of vigorous chewing for extended periods which may be double that of compositions heretobefore known to those skilled-in-the-art. For example, the flavor perception time may be as long as nine minutes, in contrast to the usual three or four minutes which is the flavor perception time of comparable products heretofore known.

The chewing gum so formed is also characterized by high degree of flavor release. The products herein described may retain as little as 25%–35% of the flavor originally present after mastication for 30 minutes. Gums heretofore available, when chewed for the same time, are found to retain as much as 60% of the flavor originally present which is being released at such a slow rate that the intensity of flavor is at an uninteresting level.

The greater availability of flavor by use of the spray-dried flavoring compositions herein described also permits attainment of high flavor level in the chewing gum products with use of lower amounts of the flavoring oils.

Chewing gums prepared with the spray-dried flavor composition in accordance with this invention, have a flavor character more nearly that of the original flavor oil than chewing gum prepared by the direct incorporation of the flavoring oil into the chewing gum.

The following specific example will serve to illustrate a preferred embodiment of this invention.

Example

According to a specific example of this invention, a 28.5% gelatin solution was prepared containing 9.5% oil of peppermint. The gelatin used had Bloom of 40, a viscosity of 19 mp. and a pH of 6.7. The solution at temperature of 120° F. was spray-dried by passage through a whirl jet type nozzle under pressure differential of about 1000 p.s.i.g. The spray pattern leaving the nozzle is passed into and through a cold air zone immediately around the nozzle outlet, formed by a blast of cold air at e.g. 70° F. directed coaxially with the direction of atomization. As the sprayed gelatin passes through this cold air zone, it hardens in the form of droplets which are then passed through a warm drying zone. Hot air to the top of the drying zone was at temperature of 500° F. and air outlet temperature at the bottom of the drying zone was 265° F.

The 40–80 micron spray-dried product recovered at the bottom of the tower contained 26.5% oil, 69.9% gelatin, and 3.6% water. 18 parts by weight of this flavoring composition were mixed with 100 parts by weight of chicle. 300 parts of sucrose and 100 parts corn syrup were added. Mixing was effected in a ribbon blender with jacketed side walls of the type manufactured by the Baker Perkins Co.

A taste test was made to compare cured chewing gum products of this invention with a cured standard chewing gum containing the same total amount of flavor in unfixed form. During the tests, 0.5" x 0.75" x 0.0625" slabs of each gum were separately chewed and the following were noted: time and intensity of initial flavor, extent of flavor burst, duration of interesting flavor level, and approximate total time during which flavor was available. In these tests, the rating of flavor intensity was measured by the person chewing, on a scale ranging from 0 to 10, the level of 1 indicating threshold flavor intensity just discernable to the taste, and a level of 10 indicating a maximum intensity above which the sensation originating in the flavor is unpleasant.

The commercially available standard containing unfixed flavor in chicle was characterized by initial indication of flavor at a level of 1 after 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

The second sample tested contained 100% spray-dried flavoring composition, prepared in accordance with the above example. Initial liberation of flavor occurred substantially immediately at a high level of 4. It rose at a fast rate to 7–8 after 7 seconds and maintained a high of 8 at 10–30 seconds. Thereafter the flavor intensity dropped slowly; at 2 minutes, the level was 6; at 4 minutes, the level was 5; at 6 minutes, the level was 3. At 9 minutes, the flavor intensity had dropped to about 1, the threshold level.

The third sample tested contained the same total amount of flavor, 75% in free unfixed form and 25% in form of the spray-dried flavoring composition of this invention. Initial liberation of flavor occurred after about 2 seconds of chewing at a level of 3. It rose to a high of 6 at 4 seconds at which point it remained to about 30 seconds. At 60 seconds, it had dropped to 5 and at 90 seconds to 4. The flavor intensity gradually dropped to a level of 2 at 5 minutes. At 7 minutes, the intensity of flavor was at the threshold level of 1.

For ease of comparison, the flavor profiles of the three samples are tabulated hereafter:

| Time | 100% Unfixed Oil | 100% Spray-Dried Oil | 25% Spray-Dried, 75% Unfixed |
|---|---|---|---|
| 1 Second | | 4 | |
| 2 Seconds | | 5 | 3 |
| 3 Seconds | | 6 | 4 |
| 4 Seconds | | | 6 |
| 5 Seconds | | 7 | |
| 7 Seconds | 1 | | 6 |
| 10 Seconds | 2 | 8 | 6 |
| 15 Seconds | 3 | 8 | |
| 20 Seconds | 4 | | |
| 30 Seconds | 5 | 8 | 6 |
| 60 Seconds | 6 | 7 | 5 |
| 90 Seconds | 3 | 6 | 4 |
| 2 Minutes | 1.5 | 6 | 4 |
| 3 Minutes | 1 | 5 | 3 |
| 4 Minutes | 1 | 5 | 2 |
| 5 Minutes | | 4 | 2 |
| 6 Minutes | | 3 | 1 |
| 7 Minutes | | 2 | 1 |
| 8 Minutes | | 2 | |
| 9 Minutes | | 1 | |
| 10 Minutes | | | |

From the above taste test, it is apparent that chewing gum containing the spray-dried flavoring composition of this invention is particularly characterized by an almost instantaneous to very early flavor liberation, which may occur in less than two seconds. This initial liberation is substantially higher, e.g. as much as 4 times higher, than the initial intensity of chewing gum containing the same amount of flavor in free unfixed form. It is also apparent that the total flavor liberated from the chewing gum products of this invention may be e.g. over three times that of the standard gum, and that this flavor may be liberated over a period up to e.g. 9 minutes, while that of the comparable standard gum is liberated in only 3–4 minutes. The flavor intensity of the new gum containing 100% spray-dried flavoring composition is at a level over most of the chewing period, higher than the maximum level reached with the standard gum. Furthermore it is apparent that chewing gums containing spray-dried flavor in amount as little as 25% of the total flavor content, the remainder of the flavor being in unfixed form, have flavor characteristics which are in all respects substantially superior to the standard gum containing only unfixed flavor.

The term "encapsulate" may be used to describe the relation of the gelatin and the flavoring agent and means that the later, in the form of a spray-dried emulsion of discrete micro-droplets, is distributed substantially uniformly within finely divided particles of the former. The flavoring agent is locked in within the gelatin to the extent that the former is released substantially only as the molecules of gelatin are dissolved from the surface of the individual gelatin particles by the action of salivary liquids.

Although we have herein described a specific example showing certain details of our invention, it will be apparent to those skilled-in-the-art that various modifications and changes may be made which come within the scope of this invention.

What is claimed is:

1. A chewing gum comprising very fine, spray-dried gelatin particles containing therewith discrete micro-droplets of a volatile, water-immiscible flavoring agent, and an all-enveloping mass of a chewable gum base within which the particles are substantially uniformly distributed.

2. A chewing gum comprising 40–300 micron spray-dried gelatin particles containing therewithin discrete micro-droplets of a volatile, water-immiscible flavoring agent, and an all-enveloping mass of a chewable gum base within which the particles are substantially uniformly distributed.

3. A chewing gum as claimed in claim 2 wherein said chewable gum base within which the particles of spray-dried gelatin are substantially uniformly distributed contains free unfixed flavoring agent.

4. A chewing gum comprising 3% to 30% by weight of very fine spray-dried gelatin particles containing therewithin discrete micro-droplets of a volatile water-immiscible flavoring agent, and 70% to 97% by weight of an all-enveloping mass of a chewable gum base within which the particles are substantially uniformly distributed.

5. A chewing gum comprising very fine spray-dried low Bloom gelatin particles contaning therewithin discrete micro-droplets of a volatile water-immiscible flavoring agent, and an all-enveloping mass of a chewable gum base within which the particles are substantially uniformly distributed.

6. A chewing gum as claimed in claim 5 wherein said gelatin has a Bloom of less than about 50 whereby rapid release of flavor is effected.

7. A chewing gum comprising very fine, spray-dried particles of low pH gelatin characterized by slow flavor release and very fine, spray-dried particles of high pH gelatin characterized by rapid flavor release, each containing dispersed therewithin discrete micro-droplets of a volatile water-immiscible flavoring agent, and an all-enveloping mass of a chewable gum base within which the particles are substantially uniformly distributed whereby as the chewing gum is chewed the flavor is released at high flavor intensity substantially evenly and uniformly over the extended chewing time.

8. A chewing gum comprising very fine, spray-dried particles of low Bloom gelatin characterized by rapid flavor release, and very fine, spray-dried particles of high Bloom gelatin characterized by slow flavor release, each containing dispersed therewithin discrete micro-droplets of a volatile water-immiscible flavoring agent, and an all-enveloping mass of a chewable gum base within which the particles are substantially uniformly distributed whereby as the chewing gum is chewed the flavor is released at high flavor intensity substantially evenly and uniformly over the extended chewing time.

9. The method of preparing a chewing gum comprising forming very fine, solid, spray-dried gelatin particles containing therewithin a volatile, water-immiscible flavoring agent, and substantially uniformly distributing said gelatin containing flavoring agent within an all-enveloping mass of a chewable gum base.

10. The method of preparing a chewing gum comprising forming a gelatin solution, mixing therewith a volatile, water-immiscible flavoring agent thereby forming an emulsion, spray-drying said emulsion whereby solid gelatin particles are formed containing therewithin said flavoring agent in the form of discrete micro-droplets, and substantially uniformly distributing said gelatin particles containing flavoring agent within an all-enveloping mass of a chewable gum base.

11. The method of preparing a chewing gum comprising mixing volatile, water-immiscible flavoring agent with a gelatin solution at temperature of about 80° F.–140° F. thereby forming an emulsion, spray-drying said emulsion to form 40–300 micron particles of gelatin each containing said flavoring agent in the form of discrete micro-droplets, and incorporating said particles within an all-enveloping mass of a chewable gum base.

12. A chewing gum comprising spray-dried gelatin particles containing therewithin discrete micro-droplets of a volatile, water-immiscible flavoring agent, and an all-enveloping mass of a chewable gum base within which the particles are substantially uniformly distributed.

13. The method of preparing a chewing gum characterized by extended flavor perception time, true flavor character, and high degree of flavor release comprising forming a spray-dried emulsion of a volatile, water-immiscible flavoring agent encapsulated within finely divided particles of gelatin, and substantially uniformly distributing said gelatin encapsulated flavoring agent within an all-enveloping mass of a chewable gum base.

References Cited in the file of this patent

UNITED STATES PATENTS

| 1,526,039 | Arkell et al. | Feb. 10, 1925 |
| 1,993,289 | Stokes et al. | Mar. 5, 1935 |
| 2,157,839 | Wertheimer | May 9, 1939 |
| 2,258,567 | Epstein et al. | Oct. 7, 1941 |